United States Patent
Zarnescu et al.

(10) Patent No.: US 9,797,599 B2
(45) Date of Patent: Oct. 24, 2017

(54) COAL FLOW BALANCING DEVICES

(75) Inventors: Vlad Zarnescu, Worcester, MA (US); Bonnie Courtemanche, Holden, MA (US); Jilin Zhang, Worcester, MA (US)

(73) Assignee: Babcock Power Services, Inc., Worcester, MA (US)

( * ) Notice: Subject to any disclaimer, the term of this patent is extended or adjusted under 35 U.S.C. 154(b) by 1028 days.

(21) Appl. No.: 13/010,568

(22) Filed: Jan. 20, 2011

(65) Prior Publication Data

US 2012/0186501 A1    Jul. 26, 2012

(51) Int. Cl.
*F23K 3/00* (2006.01)
*F23K 3/02* (2006.01)
*B65G 53/52* (2006.01)

(52) U.S. Cl.
CPC .............. *F23K 3/02* (2013.01); *B65G 53/528* (2013.01); *F23K 2203/105* (2013.01)

(58) Field of Classification Search
CPC .................................................. F23D 2201/20
USPC ............................... 110/101 R, 261; 406/181
See application file for complete search history.

(56) References Cited

U.S. PATENT DOCUMENTS

| | | | |
|---|---|---|---|
| 1,871,853 A | | 8/1932 | Kennedy |
| 1,913,675 A | * | 6/1933 | Kerr ............................... 406/181 |
| 2,364,633 A | * | 12/1944 | Hardgrove ..................... 406/155 |
| 2,868,462 A | * | 1/1959 | Bogot et al. .................... 241/53 |
| 2,975,001 A | * | 3/1961 | Davis ............................. 406/155 |
| 4,094,492 A | | 6/1978 | Beeman et al. |
| 4,356,975 A | | 11/1982 | Chadshay |
| 4,412,496 A | | 11/1983 | Trozzi |
| 4,459,922 A | | 7/1984 | Chadshay |
| 4,478,157 A | | 10/1984 | Musto |
| 4,570,549 A | * | 2/1986 | Trozzi ........................... 110/106 |
| 4,634,054 A | | 1/1987 | Grusha |
| 4,779,546 A | | 10/1988 | Walsh, Jr. |
| 4,808,043 A | * | 2/1989 | Le Marrec et al. .......... 406/181 |

(Continued)

FOREIGN PATENT DOCUMENTS

DE  3122476 A1  12/1982
EP  0687857 A2  12/1995

(Continued)

OTHER PUBLICATIONS

Extended Search Report for European Application No. EP12151892.2 dated Apr. 2, 2012.

(Continued)

*Primary Examiner* — Jason Lau
(74) *Attorney, Agent, or Firm* — Locke Lord LLP; Joshua L. Jones; Alicia J. Carroll

(57) ABSTRACT

A flow splitter distributes solid particles flowing in a fluid, such as coal particles flowing in air, through a piping system. The flow splitter includes a divider housing having an inlet configured to connect to an upstream pipe and having an outlet configured to connect to a plurality of downstream pipes, e.g., by way of a divider head. A divider body is mounted within the divider housing. A plurality of divider vanes is included, each extending from the divider body to the divider housing. The divider housing, divider body, and divider vanes are configured and adapted to reduce non-uniformity in particle concentration from the inlet and to supply a substantially equal particle flow from the outlet to each of the downstream pipes.

16 Claims, 4 Drawing Sheets

(56) References Cited

U.S. PATENT DOCUMENTS

| | | | |
|---|---|---|---|
| 5,215,259 | A | 6/1993 | Wark |
| 5,593,131 | A | 1/1997 | Briggs, Jr. et al. |
| 5,623,884 | A | 4/1997 | Penterson et al. |
| 5,685,240 | A | 11/1997 | Briggs, Jr. et al. |
| 5,934,205 | A | 8/1999 | Gordon et al. |
| 5,975,141 | A | 11/1999 | Higazy |
| 6,053,118 | A * | 4/2000 | Okamoto ............ 110/261 |
| 6,055,914 | A * | 5/2000 | Wark ............ 110/104 R |
| 6,257,415 | B1 * | 7/2001 | Wark ............ 209/722 |
| 6,474,250 | B1 * | 11/2002 | Penterson et al. ........... 110/261 |
| 6,588,598 | B2 * | 7/2003 | Wark ............ 209/143 |
| 6,789,488 | B2 | 9/2004 | Levy et al. |
| 6,811,358 | B2 * | 11/2004 | Bauver et al. ............ 406/182 |
| 7,013,815 | B2 * | 3/2006 | Levy et al. ............ 110/309 |
| 7,017,501 | B2 * | 3/2006 | Mann ............ 110/104 R |
| 2001/0037962 | A1 | 11/2001 | Wark |
| 2007/0095260 | A1 * | 5/2007 | John ............ 110/342 |
| 2008/0210325 | A1 * | 9/2008 | Aroussi ............ 138/39 |
| 2009/0272303 | A1 * | 11/2009 | Courtemanche et al. .... 110/261 |
| 2010/0006012 | A1 * | 1/2010 | Matsumoto et al. ......... 110/218 |
| 2010/0154689 | A1 | 6/2010 | Adam et al. |

FOREIGN PATENT DOCUMENTS

| | | |
|---|---|---|
| GB | 2425971 A | 11/2006 |
| JP | 60181544 | 12/1985 |
| JP | 63259316 A | 10/1988 |
| JP | 05164392 B2 | 3/2013 |
| WO | WO-2009134542 A2 | 11/2009 |

OTHER PUBLICATIONS

Communication under Article 94(3) EPC dated Jul. 12, 2013 issued in corresponding European Patent application No. EP 12 151 892.2-1605.

European Patent Office, Communication dated Jan. 2, 2014 for European Application No. 12 151 892.2.

Communication pursuant to Article 94(3) EPC dated Sep. 8, 2014 issued on corresponding European Patent Application No. 12 151 892.2-1605.

European Communication pursuant to Article 94(3) EPC issued on corresponding European Patent Application No. EP 12 151 892.2-1605.

Japanese Office Action dated Dec. 8, 2015 issued in Japanese Patent Application No. 2012-010078.

* cited by examiner

COAL FLOW BALANCING DEVICES

BACKGROUND OF THE INVENTION

1. Field of the Invention

The present invention relates to distribution of solid particles flowing in a fluid, and more particularly to coal particle distribution in airflow through coal piping systems.

2. Description of Related Art

A variety of devices and methods are known in the art for delivering pulverized coal to coal fired burners. Of such devices, many are directed to improving particle distribution within coal piping systems for delivering coal to be combusted.

Coal powered plants require an efficient means of supplying coal as fuel to produce heat power. Raw coal is typically pulverized in a coal pulverizer or mill to produce small coal particles or coal dust. The pulverized coal must then be delivered to a furnace or burner where it can be used for combustion. This is typically done with a coal piping system that utilizes air flows to transport pulverized coal particles from the mill or pulverizer to a nozzle where coal particles are injected into the coal burner or furnace. As the coal particles travel in the air flow through the piping system, bends in the piping and the pipe geometry in general tend to cause non-uniform coal particle distribution. A densely packed region of coal particles extending through a piping system is referred to a coal "rope."

Coal roping causes various technical problems for operation and maintenance of coal systems. The poor distribution of coal particles can extend into the combustion zone, where localized imbalances in the fuel/air mixture tend to cause inefficient combustion and elevated emissions of $NO_x$, CO, and other pollutants. It can also cause elevated levels of unburned carbon in the fly ash, which will lower combustion efficiency. Also, the highly abrasive nature of the coal rope impacting and scrubbing components of the coal piping and burning system causes extensive erosion of pipes and other components in the system, leading to frequent need for inspection, repairs, and replacement of parts. If inspections, repairs and replacements are not performed in a timely manner, there is an elevated chance that abrasion from coal roping will cause expensive or dangerous failures of key components.

One component that is particularly problematic for coal roping is the dividing head at the junction between a single pipe upstream of two or more branching pipes downstream, as is commonly seen upstream of directional flame burner coal nozzles, for example. In such a dividing head, if a flow with a coal rope enters the dividing head, one of the downstream legs will tend to receive the coal rope portion of the flow, meaning that one of the downstream nozzles will receive significantly more coal than the other nozzle or nozzles connected to the same dividing head.

Such conventional methods and systems have generally been considered satisfactory for their intended purpose. However, there is still a need in the art for systems and methods that allow for improved particle distribution downstream of dividing heads, for example. There also remains a need in the art for such systems and methods that are easy to make and use. The present invention provides solutions for these problems.

SUMMARY OF THE INVENTION

The subject invention is directed to a new and useful flow splitter for distributing solid particles flowing in a fluid through a piping system. The flow splitter includes a divider housing having an inlet configured to connect to an upstream pipe and having an outlet configured to connect to a plurality of downstream pipes, e.g., by way of a divider head. A divider body is mounted within the divider housing. A plurality of divider vanes is included, each extending from the divider body to the divider housing. The divider housing, divider body, and divider vanes are configured and adapted to reduce non-uniformity in particle concentration from the inlet and to supply a substantially equal particle flow from the outlet to each of the downstream pipes.

In accordance with certain aspects, the divider body is conical and is mounted concentric within the divider housing, and the divider body diverges in a direction from the inlet of the divider housing to the outlet thereof. It is contemplated that the divider body can extend from the inlet of the divider housing to the outlet thereof. It is also contemplated that the inlet can be castellated with peripherally spaced teeth that project radially inward. The inlet can be circular and the outlet can be rectangular.

In accordance with other aspects, the plurality of divider vanes includes eight divider vanes spaced apart circumferentially around a longitudinal axis of the divider body at 45° intervals, and the divider vanes extend from the inlet to the outlet. It is contemplated that the divider vanes can each be aligned parallel to a longitudinal axis running from the inlet to the outlet. In certain embodiments, the outlet is rectangular, four of the vanes are each aligned with a corner of the rectangular outlet, and four of the vanes are each aligned with a center of an edge of the rectangular outlet.

It is contemplated that a flow area can be defined between the divider housing and the divider body that is substantially constant along a flow path from the inlet to the outlet. Moreover, it is also contemplated the pressure drop through the divider housing can be less than about 3.2 in $H_2O$.

The invention also provides a coal piping system for delivering coal fines flowing in an air flow for combustion in a boiler. The system includes an upstream coal pipe for delivering coal fines from an upstream source, a divider housing having a circular inlet mounted to the upstream coal pipe and having a rectangular outlet mounted to a divider head leading to a pair of rectangular downstream coal pipes. A divider body is mounted within the divider housing. A plurality of divider vanes are included, each extending from the divider body to the divider housing. The divider housing, divider body, and divider vanes are configured and adapted to reduce non-uniformity in coal particle concentration from the inlet and to supply a substantially equal coal particle flow from the outlet to each of the downstream pipes. A pair of side kickers are included. Each side kicker is mounted in a respective one of the downstream pipes. Each side kicker protrudes inward with respect to an upstream portion of the respective downstream pipe for increasing uniformity in coal particle distribution downstream of the kicker. It is contemplated that the side kickers are mounted on opposed lateral sides of the respective downstream pipes. A pair of bottom kickers can also be included, each mounted in a respective one of the downstream pipes. The bottom kickers are both mounted on a similar side of each respective downstream pipe, e.g., both bottom kickers are mounted on the bottom side of their respective downstream pipe.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
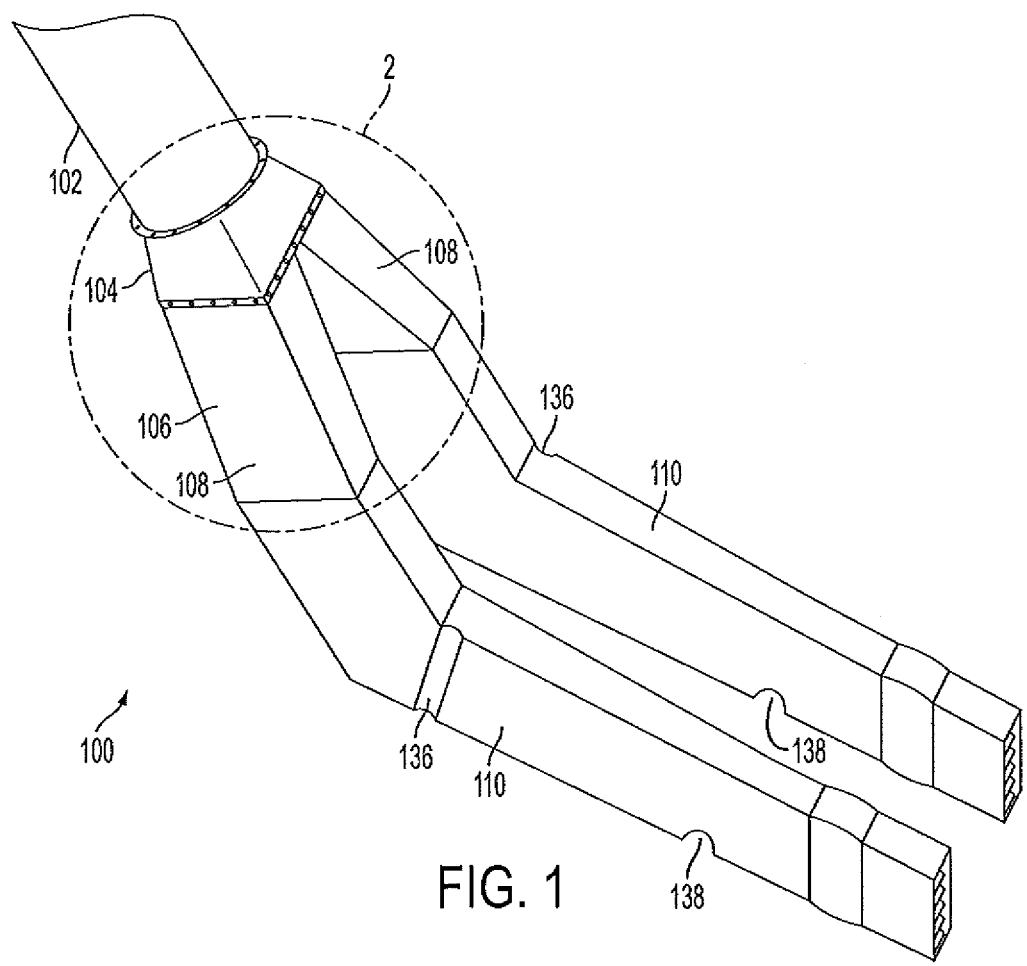
FIG. 1 is a perspective view of a portion of an exemplary embodiment of a coal piping system constructed in accordance with the present invention, showing the flow splitter device upstream of the divider head for dividing flow from a single upstream coal pipe to two downstream coal pipes.

Reference will now be made to the drawings wherein like reference numerals identify similar structural features or aspects of the subject invention. For purposes of explanation and illustration, and not limitation, a partial view of an exemplary embodiment of a coal piping system in accordance with the invention is shown in FIG. 1 and is designated generally by reference character 100. Other embodiments of coal piping systems in accordance with the invention, or aspects thereof, are provided in FIGS. 2-4, as will be described. The systems and methods of the invention can be used to improve particle distribution downstream of dividing heads, for example in coal piping systems and the like.

Coal piping system 100 includes an upstream pipe 102 for conveying coal fines from an upstream source such as a pulverizer, in a flow of air to be burned in a downstream furnace or boiler. Flow splitter 104 connects to pipe 102 and includes internal components, which are described in detail below, for evenly distributing solid particles flowing in a fluid through system 100. The split in the flow from upstream pipe 102 is initiated by flow splitter 104, and the split is complete in dividing head 106 downstream of flow splitter 104. Each leg 108 of dividing head 106 is attached to a separate downstream coal pipe 110, which in turn leads to a coal nozzle, for example, where the coal is injected for combustion.

Figure 2:
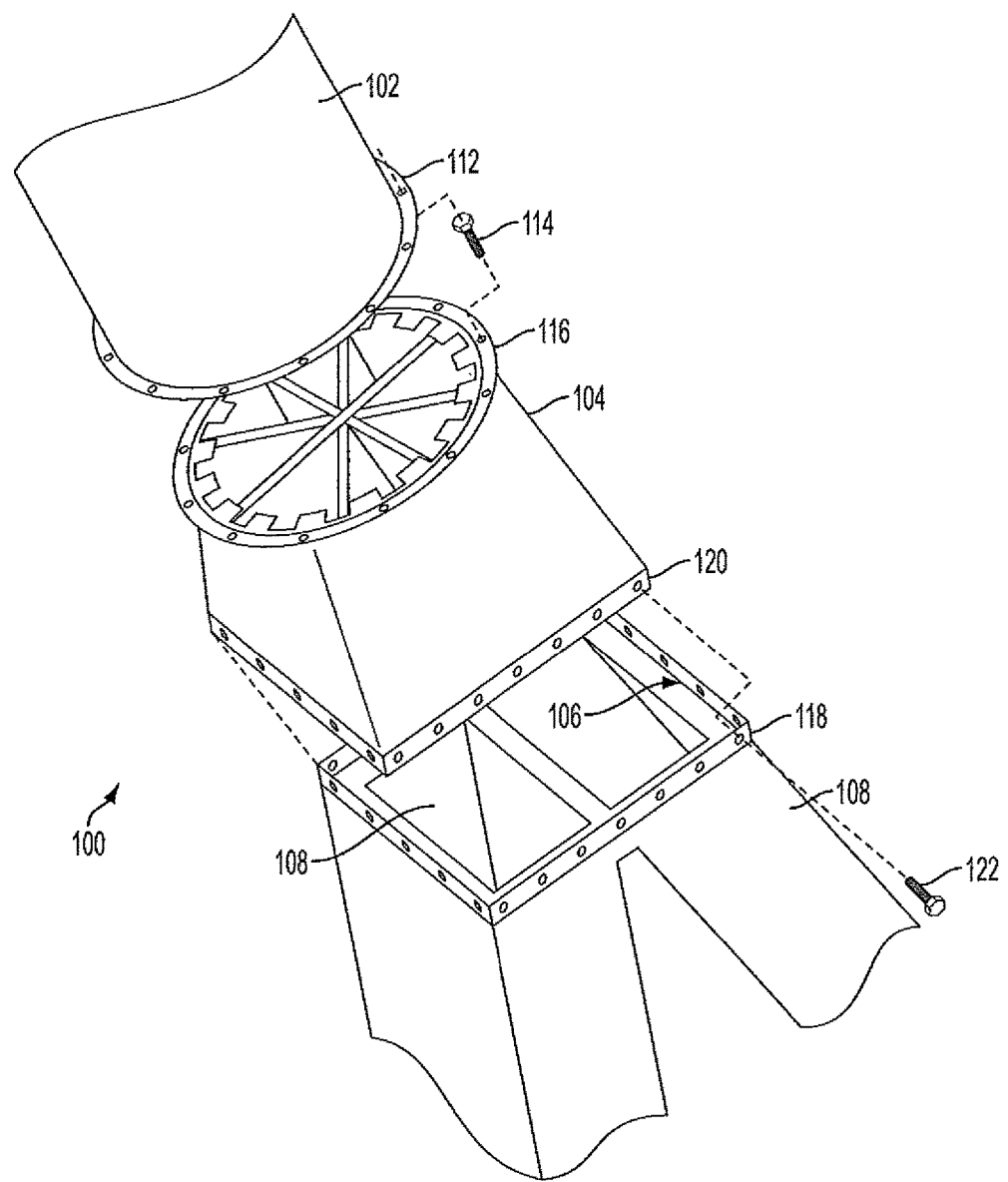
FIG. 2 is an exploded perspective view of a portion of the coal piping system of FIG. 1, showing an enlarged view of the flow splitter separated from the upstream pipe and divider head.

Referring now to FIG. 2, flow splitter 104 is configured to be mounted between coal pipe 102 and divider head 106. The circular flange 112 of pipe 102 can be bolted, e.g., buy bolts such as bolt 114, to circular flange 116 of flow splitter 104. Similarly, rectangular flange 118 can be bolted, e.g., buy bolts such as bolt 122, to rectangular flange 120 of flow splitter 104. It is contemplated that flow splitter 104 can be mounted between existing flanges of a coal pipe and an adjacent divider head as a retrofit with little or no modification needed to the existing system. It is also contemplated that flow splitters such as flow splitter 104 can be mounted in newly constructed coal piping systems.

Figure 3:
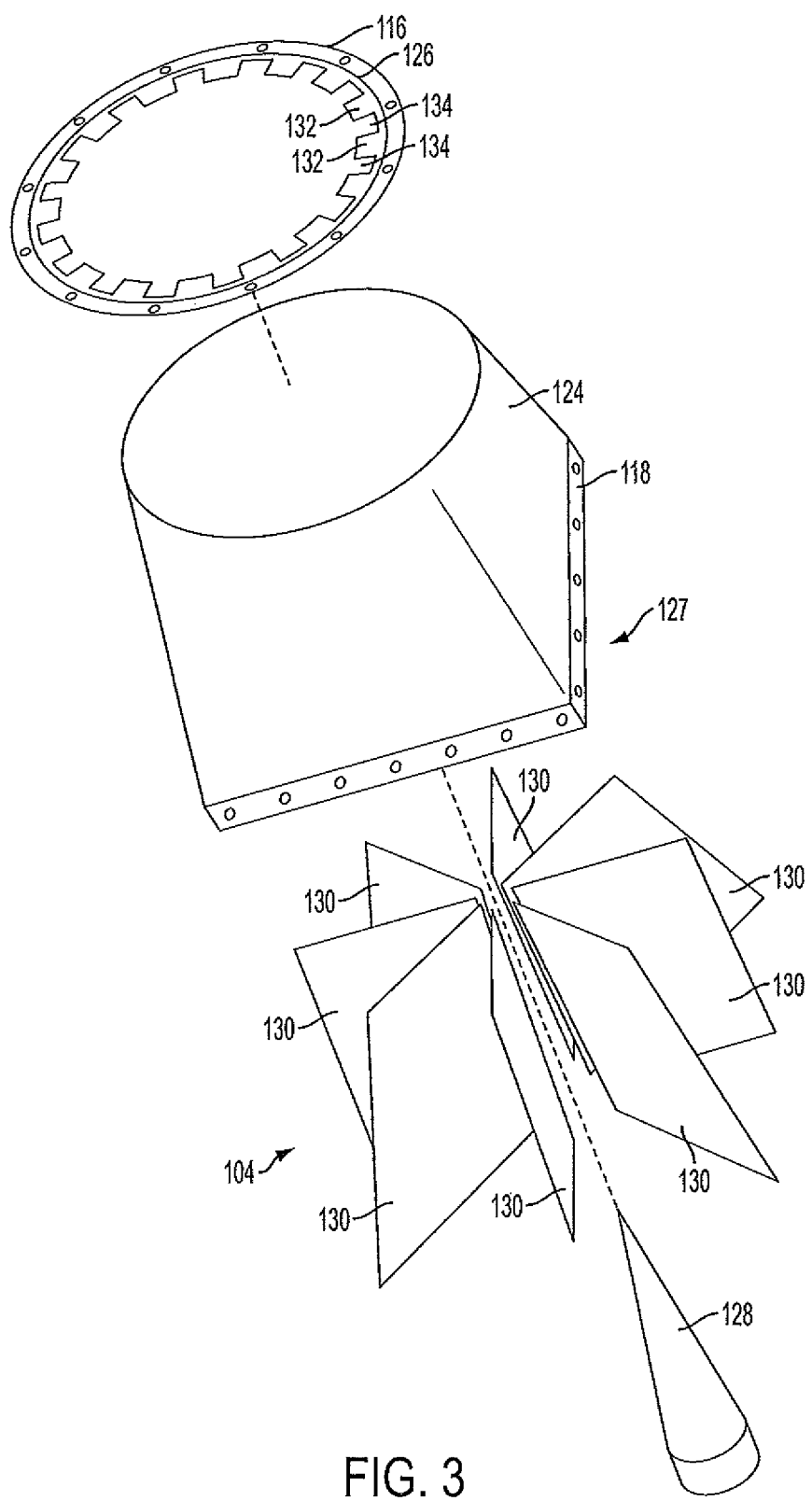
FIG. 3 is an exploded perspective view of a the flow splitter of FIG. 2, showing the divider body, divider vanes, and the teeth of the castellated inlet.

With reference now to FIG. 3, the internal components of flow splitter 104 are contained within a divider housing 124, which includes a circular inlet 126 mounted to upstream coal pipe 102 by flange 116 as described above. Inlet 126 is castellated with peripherally spaced teeth 132 that project radially inward between peripherally spaced gaps 134 (in FIG. 3, only some of the teeth 132 and gaps 134 are labeled with reference characters for sake of clarity). There are a total of sixteen teeth 132 and sixteen gaps 134, however, those skilled in the art will readily appreciate that any suitable number of teeth/gaps can be used from application to application without departing from the spirit and scope of the invention. The outlet of divider housing 124 is a rectangular outlet 127 mounted to divider head 106 as described above. The exterior and interior surfaces of divider housing 124 generally define a shape that is a constant blend from a circular cross-section at circular inlet 126 to a square cross-section at rectangular outlet 127. While rectangular outlet 127 of divider housing 124 is shown and described as being square, those skilled in the art will readily appreciate that a rectangle of any other suitable proportions, or any other suitable shape in general, can be used for the outlet without departing from the spirit and scope of the invention.

A divider body 128 is mounted in concentric, axial alignment within divider housing 124, and extends from the inlet end of divider housing 124 to the outlet end thereof. Divider body 128 is conical and diverges in a direction from the inlet end of divider housing 124 toward the outlet end thereof.

Figure 4:
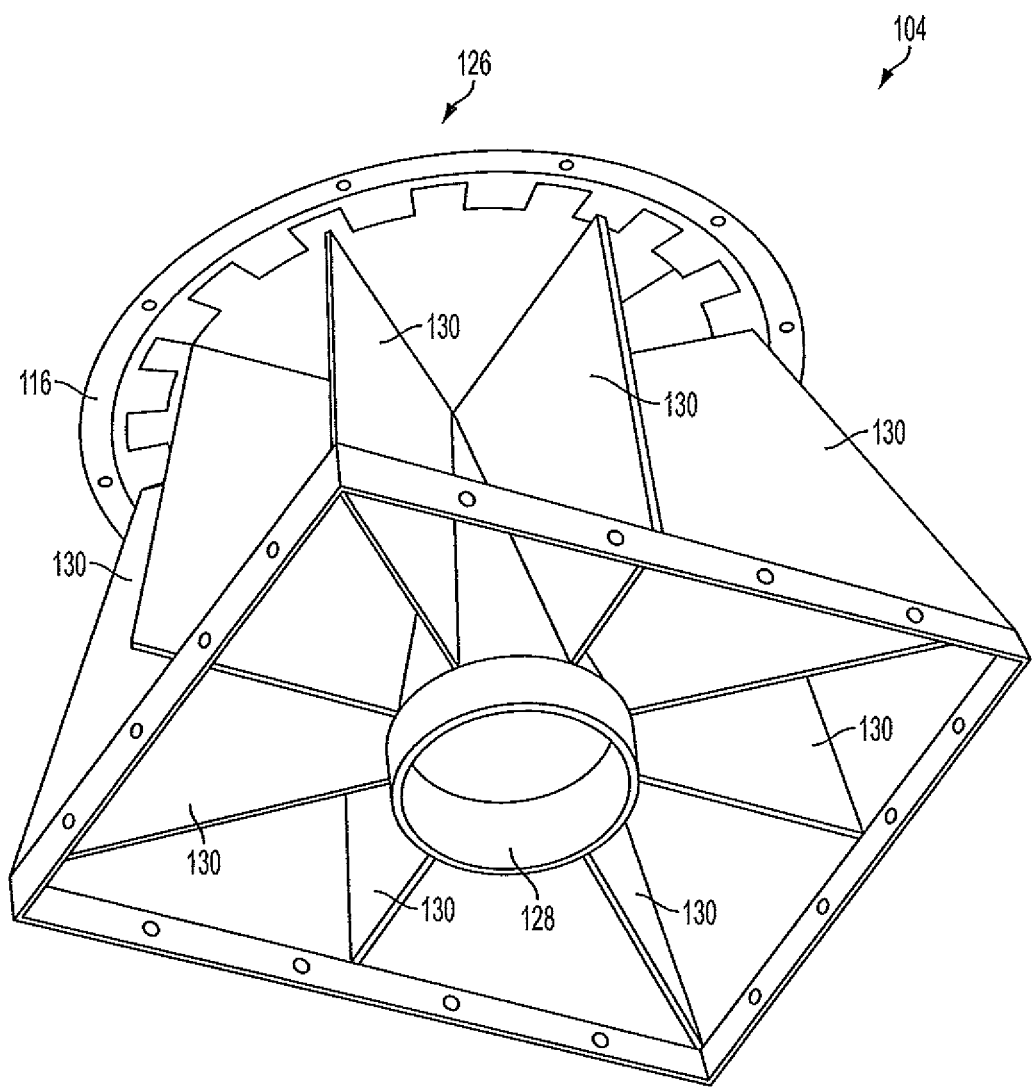
FIG. 4 is a cut-away perspective view of a portion of the flow splitter of FIG. 2, showing the divider body from downstream.

Referring still to FIG. 3, eight divider vanes 130 are included within divider housing 124, each extending radially from divider body 128 in the center to divider housing 124. Divider housing 124, divider body 128, and divider vanes 130 are welded together, but could also be joined using any other suitable technique without departing from the spirit and scope of the invention. FIG. 4 shows splitter device 104 with divider housing 124 removed to show the arrangement of divider body 128 and divider vanes 130. The eight divider vanes 130 are spaced apart circumferentially around a longitudinal axis of divider body 128 at 45° intervals. In the axial direction, the eight divider vanes 130 extend from the inlet end to the outlet end of divider housing 124, and stop just short of the outlet end of divider body 128. As shown in FIG. 4, the outlet end of divider body 128 is cylindrical downstream of vanes 130, and divider body 128 is hollow, with the downstream end thereof being open.

Divider vanes 130 are each aligned parallel to the longitudinal axis running from the inlet end to the outlet end of divider body 128. Four of the divider vanes are each aligned with a corner of the rectangular outlet of divider housing 124, and four of the divider vanes 130 are each aligned with a center of an edge of the rectangular outlet of divider housing 124. The radially inner and outer edges of each divider vane 130 conform to the adjacent surface of divider body 128 and divider housing 124, respectively. The alignment of the divider vanes 128 and the teeth 132 and gaps 134 of inlet 126 shown in FIGS. 2 and 4 is exemplary, as it is contemplated that any suitable alignment of these elements can be used without departing from the spirit and scope of the invention.

Flow splitter 104 is a generally two-part construction, namely, the ring of toothed inlet 126, and the eight-way distributor in the main portion of flow splitter 104 that includes eight divider vanes 130. The overall shape and flow area of flow splitter 104 described above are configured to reduce or minimize the impact on pressure drop in coal piping systems utilizing flow splitter 104. It is contemplated the pressure drop through flow splitter 104 can be less than about 3.2 in $H_2O$. It is contemplated that a flow area can be defined between the divider head and the divider body that is substantially constant along a flow path from the inlet to the outlet.

With reference again to FIG. 1, downstream pipes 110 include kickers to enhance flow uniformity. Each pipe 110 includes a side kicker 136, and a lower kicker 138. Each kicker 136 and 138 is a bumper that protrudes inward with respect to the main cross-sectional area of the respective pipe 110, e.g., with respect to the portions upstream and downstream of the respective kicker. These protrusions into the flow area cooperate with splitter device 104 to increase uniformity in coal particle distribution downstream of each kicker 136 and 138. Advanced erosion materials can be applied to flow splitter 104 and kickers 136 and 138 to provide extended life and performance.

Divider housing 124, divider body 128, and divider vanes 130 are configured and adapted to reduce non-uniformity in particle concentration from the inlet and to supply a substantially equal particle flow from the outlet to each of the downstream pipes. In particular, flow splitter 104 is configured to break the coal rope and redistribute the coal particles between two downstream pipes, such as those in the rectangular directional flame burner coal nozzles described in U.S. Pat. No. 5,623,884, which is incorporated by reference herein in its entirety.

Flow splitter 104 creates a more uniform coal distribution in a flow of coal passing therethrough, which results in improved controllable combustion performance. Flow splitter 104 is also configured and adapted to balance the flow of coal at the division point between the upstream coal pipe, e.g., pipe 102, and the two downstream pipes, e.g., pipes 110. In other words, flow splitter 104 improves particle distribution by both breaking up any coal rope to provide substantially equal amounts of coal to each downstream pipe 110, and also by distributing coal particles substantially uniformly within each downstream pipe 110. This is accomplished by the combination of the toothed ring of inlet 126 breaking any coal rope and by the flow splitter of vanes 130 together with the kickers 136, 138 further distributing and balancing the distribution of particles into the two downstream pipes 110. This is particularly advantageous when the two downstream pipes 110 are part of directional flame burner coal nozzles.

Since flow splitter 104 balances the flow in piping system 100, the more even distribution of coal particles and air in each coal dividing head leg 108 produces a more uniform, balanced flow to the burners, nozzles, or the like, downstream thereof. The specific shape of flow splitter 104 creates regions of cross mixing using a combination of sloped (e.g., the surface of divider body 128), segmented (e.g., the toothed portion of inlet 126), and solid (e.g. the surfaces of vanes 130) areas around the circumference of the device. Precise placement of flow splitter 104 is based on coal pipe orientation and is important for optimum fuel balancing. The placement shown and described herein is exemplary, and those skilled in the art will readily appreciate that any other suitable positioning can be used for a given application without departing from the spirit and scope of the invention.

While described above in the exemplary context of two downstream pipes 110, those skilled in the art will readily appreciate that any suitable number of downstream pipes can be used without departing from the spirit and scope of the invention. Moreover, while described herein in the exemplary context of coal piping systems, those skilled in the art will readily appreciate that the methods and devices described herein can be used with any other suitable type of flow with particles flowing in a fluid without departing from the spirit and scope of the invention.

The methods and systems of the present invention, as described above and shown in the drawings, provide systems for particle distribution with superior properties including more uniform flow downstream of divider heads. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A flow splitter for distributing solid particles flowing in a fluid through a piping system, the flow splitter comprising:
   a) a divider housing having an inlet configured to connect to an upstream pipe and having an outlet configured to connect to a plurality of downstream pipes, wherein the inlet is castellated around its periphery with peripherally spaced teeth that project radially inward, and wherein all of the teeth are uniform;
   b) a conical divider body mounted concentric within the divider housing, wherein the conical divider body diverges in a direction from the inlet of the divider housing to the outlet thereof, and wherein the conical divider body extends from the inlet of the divider housing to the outlet thereof, wherein a base of the conical divider body is defined at the outlet of the divider housing and a tip of the conical divider body is defined at the inlet of the divider housing; and
   c) a plurality of divider vanes, each extending from the conical divider body to the divider housing, and each divider vane extending from the base of the conical divider body to the tip thereof, wherein the divider housing, conical divider body, and divider vanes are configured and adapted to reduce non-uniformity in particle concentration from the inlet and to supply a substantially equal particle flow from the outlet to each of the downstream pipes.

2. A flow splitter as recited in claim 1, wherein the inlet is circular and the outlet is rectangular.

3. A flow splitter as recited in claim 1, wherein the plurality of divider vanes includes eight divider vanes spaced apart circumferentially around a longitudinal axis of the conical divider body at 45° intervals.

4. A flow splitter as recited in claim 1, wherein the divider vanes are each aligned parallel to a longitudinal axis running from the inlet to the outlet.

5. A flow splitter as recited in claim 1, wherein the outlet is rectangular, wherein the plurality of divider vanes includes eight divider vanes spaced apart circumferentially around a longitudinal axis of the conical divider body at 45° intervals, wherein four of the vanes are each aligned with a corner of the rectangular outlet, and wherein four of the vanes are each aligned with a center of an edge of the rectangular outlet.

6. A flow splitter as recited in claim 1, wherein a flow area defined between the divider housing and the conical divider body is substantially constant along a flow path from the inlet to the outlet.

7. A flow splitter as recited in claim 1, wherein the pressure drop through the divider housing is less than about 3.2 $inH_2O$.

8. A coal flow splitter for distributing coal fines flowing in an air flow through a coal piping system, the coal flow splitter comprising:

a) a divider housing having a circular inlet configured to connect to an upstream coal pipe and having an outlet configured to connect to a pair of rectangular downstream coal pipes, wherein the inlet is castellated around its periphery with peripherally spaced teeth that project radially inward, and wherein all of the teeth are uniform;

b) a conical divider body mounted concentric within the divider housing, wherein the conical divider body diverges in a direction from the inlet of the divider housing to the outlet thereof, and wherein the conical divider body extends from the inlet of the divider housing to the outlet thereof, wherein a base of the conical divider body is defined at the outlet of the divider housing and a tip of the conical divider body is defined at the inlet of the divider housing; and c) a plurality of divider vanes, each extending from the conical divider body to the divider housing, and each divider vane extending from the base of the conical divider body to the tip thereof, wherein the divider housing, conical divider body, and divider vanes are configured and adapted to reduce non-uniformity in coal particle concentration from the inlet and to supply a substantially equal coal particle flow from the outlet to each of the downstream coal pipes.

9. A coal flow splitter as recited in claim 8, wherein the plurality of divider vanes includes eight divider vanes spaced apart circumferentially around a longitudinal axis of the conical divider body at 45° intervals, wherein four of the vanes are each aligned with a corner of the rectangular outlet, wherein four of the vanes are each aligned with a center of an edge of the rectangular outlet, and wherein the divider vanes are each aligned parallel to a longitudinal axis running from the inlet to the outlet.

10. A coal flow splitter as recited in claim 8, wherein a flow area defined between the divider housing and the conical divider body is substantially constant along a flow path from the inlet to the outlet, and wherein the pressure drop through the divider housing is less than about 3.2 $inH_2O$.

11. A coal piping system for delivering coal fines flowing in an air flow for combustion in a boiler, the system comprising:

a) an upstream coal pipe for delivering coal fines from an upstream source;

b) a divider housing having a circular inlet mounted to the upstream coal pipe and having a rectangular outlet mounted to a divider head leading to a pair of rectangular downstream coal pipes, wherein the inlet is castellated around its periphery with peripherally spaced teeth that project radially inward, and wherein all of the teeth are uniform;

c) a conical divider body mounted concentric within the divider housing, wherein the conical divider body diverges in a direction from the inlet of the divider housing to the outlet thereof, and wherein the conical divider body extends from the inlet of the divider housing to the outlet thereof, wherein a base of the conical divider body is defined at the outlet of the divider housing and a tip of the conical divider body is defined at the inlet of the divider housing;

d) a plurality of divider vanes, each extending from the conical divider body to the divider housing, and each divider vane extending from the base of the conical divider housing to the tip thereof, wherein the divider housing, conical divider body, and divider vanes are configured and adapted to reduce non-uniformity in coal particle concentration from the inlet and to supply a substantially equal coal particle flow from the outlet to each of the downstream pipes; and e) a pair of side kickers, each side kicker being mounted in a respective one of the downstream pipes, each side kicker protruding inward with respect to an upstream portion of the respective downstream pipe for increasing uniformity in coal particle distribution downstream of the kicker.

12. A coal piping system as recited in claim 11, wherein the side kickers are mounted on opposed lateral sides of the respective downstream pipes, and further comprising a pair of bottom kickers each mounted in a respective one of the downstream pipes, wherein the bottom kickers are mounted on a similar side of each respective downstream pipe.

13. A coal piping system as recited in claim 12, wherein the plurality of divider vanes includes eight divider vanes spaced apart circumferentially around a longitudinal axis of the conical divider body at 45° intervals, wherein four of the vanes are each aligned with a corner of the rectangular outlet, wherein four of the vanes are each aligned with a center of an edge of the rectangular outlet, and wherein the divider vanes are each aligned parallel to a longitudinal axis running from the inlet to the outlet.

14. A flow splitter as recited in claim 1, wherein a radially inner edge of each divider vane conforms to a respective conical surface of the conical divider body and a radially outer edge of each divider vane conforms to a respective inner surface of the divider housing.

15. A coal flow splitter as recited in claim 8, wherein a radially inner edge of each divider vane conforms to a respective conical surface of the conical divider body and a radially outer edge of each divider vane conforms to a respective inner surface of the divider housing.

16. A coal piping system as recited in claim 11, wherein a radially inner edge of each divider vane conforms to a respective conical surface of the conical divider body and a radially outer edge of each divider vane conforms to a respective inner surface of the divider housing.

* * * * *